United States Patent
Ishida et al.

(10) Patent No.: US 6,309,807 B1
(45) Date of Patent: Oct. 30, 2001

(54) DISAZO DYE FOR THERMAL TRANSFER RECORDING AND THERMAL TRANSFER SHEET AND INK FOR THERMAL TRANSFER RECORDING, EMPLOYING IT

(75) Inventors: Mio Ishida; Koji Maeda; Yukichi Murata, all of Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/466,792

(22) Filed: Dec. 20, 1999

(30) Foreign Application Priority Data

Dec. 22, 1998 (JP) .................................................. 10-364508

(51) Int. Cl.⁷ .............................. G03C 1/73; G03C 8/10; C07C 245/00; C09B 31/02; B41M 5/20
(52) U.S. Cl. .............................. 430/338; 430/201; 8/471; 8/687; 503/227; 534/831
(58) Field of Search ............................. 534/831; 430/201, 430/338; 503/227; 8/471, 687

(56) References Cited

U.S. PATENT DOCUMENTS

| | | | | |
|---|---|---|---|---|
| 2,134,521 | * | 10/1938 | Knight | 534/831 |
| 3,997,522 | * | 12/1976 | Siegel et al. | 534/831 |
| 4,231,746 | * | 11/1980 | Dehnert et al. | 534/831 |
| 5,877,301 | | 3/1999 | Murata et al. | 534/788 |

FOREIGN PATENT DOCUMENTS

| | | |
|---|---|---|
| 1927 918 | 12/1970 | (DE) . |
| 28 40 825 | 4/1980 | (DE) . |
| 0 055 838 | 7/1982 | (EP) . |
| 0 544 301 | 2/1993 | (EP) . |
| 60-180889 | 9/1985 | (JP) . |

* cited by examiner

Primary Examiner—Richard L. Schilling
(74) Attorney, Agent, or Firm—Oblon, Spivak, McClelland, Maier & Neustadt, P.C.

(57) ABSTRACT

A disazo dye for thermal transfer recording of the following formula (I):

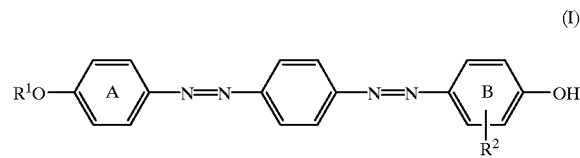

wherein each of rings A and B which are independent of each other, is a benzene ring which may have a substituent, $R^1$ is a $C_{1-4}$ substituted or unsubstituted alkyl group, and $R^2$ is a group selected from the group consisting of a hydrogen atom and a $C_{1-4}$ substituted or unsubstituted alkyl group.

4 Claims, No Drawings

DISAZO DYE FOR THERMAL TRANSFER RECORDING AND THERMAL TRANSFER SHEET AND INK FOR THERMAL TRANSFER RECORDING, EMPLOYING IT

The present invention relates to a disazo dye having a specific structure useful for thermal transfer recording, particularly for thermal transfer recording of dye-transferring type, and a thermal transfer sheet and an ink for thermal transfer recording, employing such a dye.

The thermal transfer recording of dye-transferring type is a recording method wherein a thermal transfer sheet having an ink layer containing a thermally transferable dye formed on a base film is overlaid on an image-receiving sheet having an image-receiving layer on its surface, and the thermal transfer sheet is heated to transfer the dye in the thermal transfer sheet to the image-receiving sheet thereby to carry out recording. This recording method is applied to full color image recording by e.g. a video printer, since it is thereby possible to control the transfer amount of the dye by the quantity of the thermal energy and thereby to carry out gradation expression.

In the thermal transfer recording of dye-transferring type, the dye to be used for the thermal transfer sheet and the ink composition for the thermal transfer sheet, is very important, as it substantially influences over the speed of the thermal transfer recording, the image quality and storage stability of the recorded product, and such a dye is required to satisfy the following conditions.

① It readily sublimates or thermally diffuses under the operational condition of the thermal recording head.
② It undergoes no thermal decomposition under the operational condition of the thermal recording head.
③ It has a desirable color for color reproduction.
④ It has a large molecular extinction coefficient.
⑤ It is stable against heat, light, moisture, chemicals, etc.
⑥ It is easy to prepare.
⑦ It is suitable for preparation of an ink.
⑧ It has no problem for safety.

As disazo dyes for thermal transfer recording to satisfy such conditions, JP-A-60-180889 discloses a dye having no $OR^1$ group in the formula (I) of the present invention and a dye having a substituent (a methyl group) on the phenyl group which connects the two disazo groups in the formula (I) of the present invention.

However, the dyes disclosed in the publication are required to be further improved with respect to the color density, light resistance and color tone on the sheet or recorded product.

It is an object of the present invention to provide a disazo dye which exhibits excellent performance in all of the above properties ① to ⑧ as a dye for a thermal transfer recording of dye-transferring type, and a thermal transfer sheet and an ink for thermal transfer recording, employing such a disazo dye.

Under these circumstances, present inventors have conducted an extensive study and as a result, have found that a disazo dye having a certain specific structure is a yellow dye which satisfies the above conditions and which is excellent in the balance of all of the color density, light resistance and color tone. The present invention has been accomplished on the basis of this discovery.

Namely, the present invention provides a disazo dye for thermal transfer recording of the following formula (I):

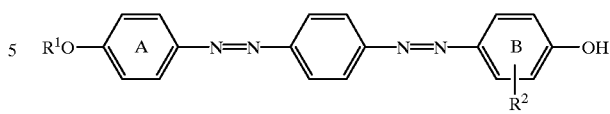

wherein each of rings A and B which are independent of each other, is a benzene ring which may have a substituent, $R^1$ is a $C_{1-4}$ substituted or unsubstituted alkyl group, and R is a group selected from the group consisting of a hydrogen atom and a $C_{1-4}$ substituted or unsubstituted alkyl group, and a thermal transfer sheet and an ink for thermal transfer recording, employing such a dye.

Now, the present invention will be described in detail with reference to the preferred embodiments.

The structural characteristics of the disazo dye of the present invention are such that rings A and B have certain specific substituents, and the benzene ring at the center is unsubstituted.

In the disazo dye of the formula (I) of the present invention, the $C_{1-4}$ substituted or unsubstituted alkyl group for $R^1$ may, for example, be a straight chain or branched chain alkyl group, and specifically, it may, for example, be a methyl group, an ethyl group, a n-propyl group, an i-propyl group, a n-butyl group or an i-butyl group. The substituent may, for example, be an alkoxy group, an alkoxyalkoxy group, an aryloxy group, an allyloxy group, an aralkyloxy group, an aryl group, a cyano group, a hydroxyl group, a halogen atom, an alkoxycarbonyl group, an allyloxycarbonyl group or an acyloxy group. If the carbon number of $R^1$ is too large, the color density tends to be low. Accordingly, $R^1$ is preferably a methyl group or an ethyl group, most preferably a methyl group. Further, $R^1$ is preferably an unsubstituted alkyl group.

The $C_{1-4}$ substituted or unsubstituted alkyl group for $R^2$ may, for example, be a straight chain or branched chain alkyl group, and specifically, it may, for example, be a methyl group, an ethyl group, a n-propyl group, an i-propyl group, a n-butyl group or an i-butyl group. The substituent may, for example, be an alkoxy group, an alkoxyalkoxy group, an aryloxy group, an allyloxy group, an aralkyloxy group, an aryl group, a cyano group, a hydroxyl group, a halogen atom, an alkoxycarbonyl group, an allyloxycarbonyl group or an acyloxy group.

If the carbon number of $R^2$ is too large, the color density tends to be low. Accordingly, $R^2$ is preferably a methyl group or an ethyl group, more preferably a methyl group or an ethyl group, most preferably a methyl group. Further, $R^2$ is preferably an unsubstituted alkyl group. The position for substitution of $R^2$ is not particularly limited, but it is particularly preferred that $R^2$ is substituted at the meta-position to the carbon atom on ring B on which the azo group is substituted, i.e. at the ortho-position to the carbon atom on which the hydroxyl group is substituted, as the light resistance is thereby good.

Each of rings A and B is a benzene ring which may further have a substituent, and the substituent may, for example, be an alkyl group, an alkoxy group, a halogen atom, a hydroxyl group, a nitro group, a cyano group, an alkoxycarbonyl group, an alkylsulfonyl group or an acylamino group. The number of substituents on ring A or B may be two or more, and in such a case, the plurality of substituents may be the same or different from one another.

Among the dyes of the present invention, a dye of the following formula (II):

$$R^{1'}O-\text{Ar}-N=N-\text{Ar}-N=N-\text{Ar}(R^{2'})-OH \quad (II)$$

wherein each of $R^{1'}$ and $R^{2'}$ which are independent of each other, is a group selected from the group consisting of a methyl group and an ethyl group, is a dye having a novel structure, and it is a preferred dye which is easy to prepare and which exhibits excellent performance with a good balance of the color density, light resistance and color tone of the recorded product. Among them, a dye of the formula (II) wherein each of $R^{1'}$ and $R^{2'}$ is a methyl group, is most preferred from the viewpoint of the color density.

Now, specific examples of the dye of the formula (I) will be shown below.

TABLE 1

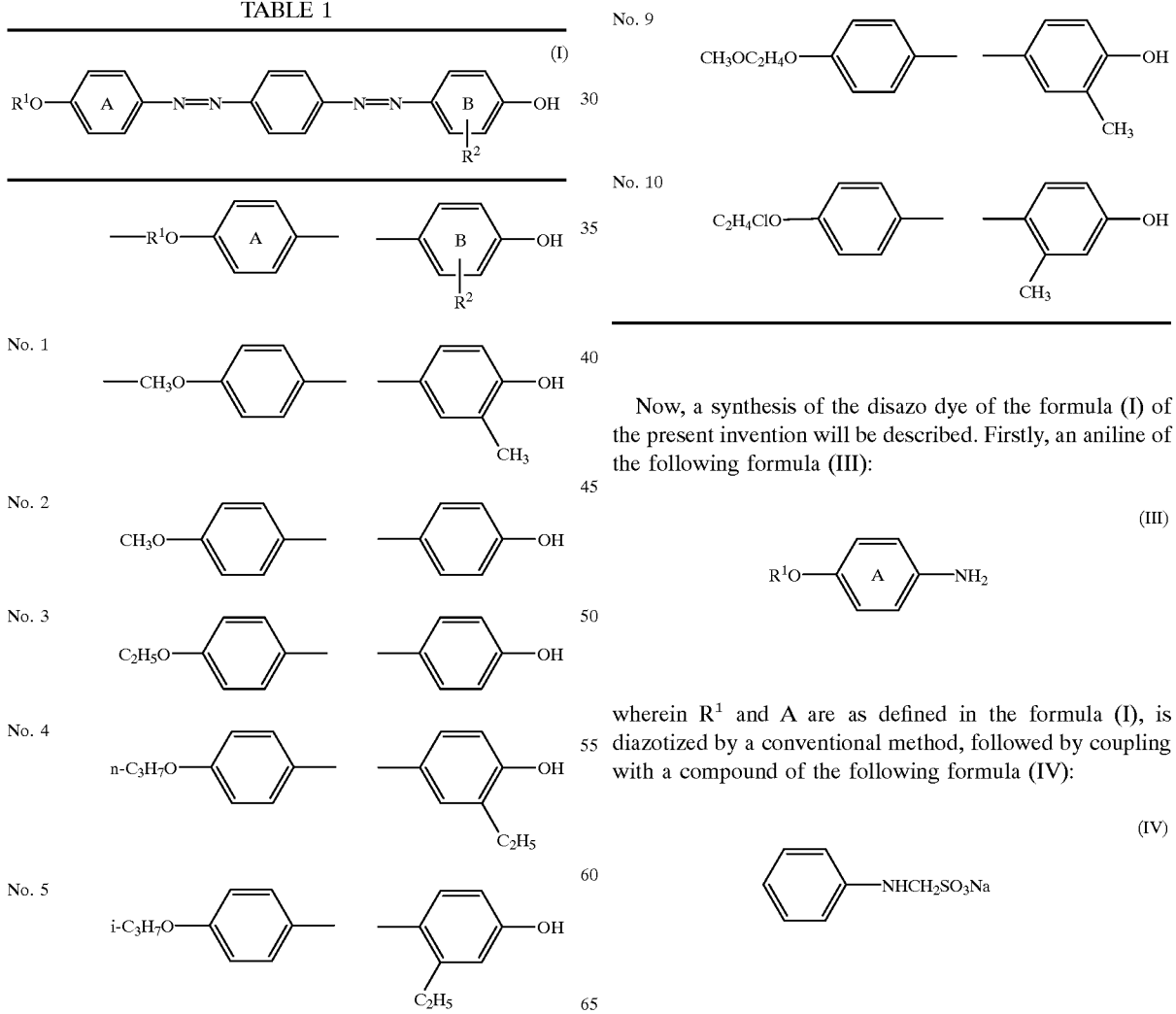

TABLE 1-continued

Now, a synthesis of the disazo dye of the formula (I) of the present invention will be described. Firstly, an aniline of the following formula (III):

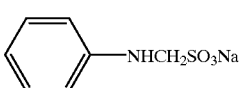

wherein $R^1$ and A are as defined in the formula (I), is diazotized by a conventional method, followed by coupling with a compound of the following formula (IV):

$$\text{C}_6\text{H}_5-\text{NHCH}_2\text{SO}_3\text{Na} \quad (IV)$$

and the reaction solution is alkalized and heated to synthesize a monoazo compound of the following formula (V):

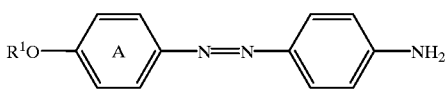

(V)

wherein $R^1$ and A are as defined in the formula (I). Then, the monoazo compound (V) is further diazotized, followed by coupling with a compound of the following formula (VI):

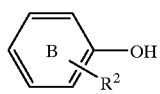

(VI)

wherein B and $R^2$ are as defined in the formula (I), to obtain the disazo dye of the formula (I) of the present invention.

The thermal transfer sheet of the present invention usually contains at least one type of the dye of the above formula (I) in an ink layer. Otherwise, the dye of the formula (I) may be used in combination with a dye having a different structure. When an ink layer is formed by using the above dye for the thermal transfer sheet of the present invention, the method is not particularly limited. However, usually, the dye may be dissolved or dispersed in the form of fine particles in a medium together with a binder to prepare an ink, and the ink may be coated on a base film as a substrate, followed by drying to obtain a thermal transfer sheet.

To carry out thermal transfer recording, it is common that a thermal transfer sheet having an ink layer and an image-receiving sheet having an image-receiving layer on one side of a substrate, are overlaid each other so that the ink layer side of the thermal transfer sheet and the ink-receiving layer side of the image-receiving sheet face each other, and a heat corresponding to an image signal is applied from the side opposite to the ink layer side of the thermal transfer sheet by means of a heat source such as a line-type thermal head, to transfer the dye in the ink layer to the image-receiving layer. At that time, the amount of the dye which transfers, can be changed depending upon the quantity of the heat applied, whereby expression of gradation is possible and it is possible to obtain a fine image. By repeating the same operation with respect to three colors of yellow, magenta and cyan or four colors having black added thereto, it is possible to obtain an image with a photographic tone.

For a yellow ink layer, the disazo dye of the present invention is employed as a yellow dye, but it may be used in a proper combination with other yellow dyes, such as a pyridone azo dye, a quinophthalone dye, styryl dye, etc. within a range not to impair the performance of the present invention.

For a magenta ink layer, an anthraquinone dye, an imidazole azo dye, a thiadiazole azo dye or the like may be suitably employed as a magenta dye. For a cyan ink layer, an anthraquinone dye, a thiazole azo dye or an indophenol dye may be suitably employed as a cyan dye. As the cyan dye, an indophenol dye disclosed, for example, in JP-A-60-239289, JP-A-61-35994 or JP-A-61-148269, is most suitable.

The binder to be used for the preparation of the ink may, for example, be a water-soluble resin of e.g. cellulose type, acrylic acid type, starch type or an epoxy type, or a resin soluble in an organic solvent, such as an acrylic resin, a methacrylic resin, a polystyrene, a polycarbonate, a polyethersulfone, a polyvinylbutyral, an ethylcellulose, an acetylcellulose, a polyester, an AS resin or a phenoxy resin. The ratio of the binder to the dye in the ink is preferably within a range of from 1:2 to 2:1.

The medium for the preparation of the ink may, for example, be, in addition to water, an alcohol such as methylalcohol, ethylalcohol, isopropylalcohol or isobutylalcohol, a cellosolve such as methylcellosolve or ethylcellosolve, an aromatic hydrocarbon such as toluene, xylene or chlorobenzene, an ester such as ethyl acetate or butyl acetate, a ketone such as acetone, methyl ethyl ketone, methyl isobutyl ketone or cyclohexanone, a chlorine type solvent such as methylene chloride, chloroform or trichloroethylene, an ether such as tetrahydrofuran or dioxane, or an organic solvent such as N,N-dimethylformamide or N-methylpyrrolidone.

In addition to the above components, organic or inorganic non-sublimable fine particles, a dispersant, an antistatic agent, a defoaming agent, an antioxidant, a viscosity-regulating agent, etc., may be added to the above ink, as the case requires.

The base film on which the ink is coated to prepare a thermal transfer sheet, may be a thin paper such as condenser paper or glassine paper, or a plastic film having good heat resistance, such as polyester, polycarbonate, polyamide, polyimide or polyaramide. The thickness may be within a range of from 3 to 50 µm.

Among the base films, a polyethylene terephthalate film is especially advantageous from the viewpoint of the mechanical strength, solvent resistance and economical efficiency. However, in some cases, the polyethylene terephthalate film is not necessarily adequate in the heat resistance, and the running property of the thermal head tends to be inadequate. Accordingly, the running property of the thermal head may be improved by forming a heat resistance resin layer containing a lubricating agent, highly lubricating heat resistant fine particles, a surfactant and a binder, on the side opposite to the ink layer. Among them, the lubricating agent may, for example, be an amino-modified silicone resin or a carboxy-modified silicone compound, the heat resistant fine particles may be fine particles of e.g. silica, and the binder may, for example, be an acrylic resin.

Coating of the ink on the base film can be carried out by means of a gravure coater, a reverse roll coater, a rod coater or an air doctor coater. The ink may be coated so that the thickness of the ink layer would be within a range of from 0.1 to 5 µm after drying.

As a heating means for the thermal transfer sheet of the present invention, not only a thermal head but also infrared rays, a laser beam or the like may be employed. Further, by means of a current-conducting heat-generation film, which generates a heat when an electric current is supplied to the base film itself, the thermal transfer sheet may be employed as a current-conducting type dye transfer sheet.

An image-receiving sheet to be used for thermal transfer recording of the present invention, has an image-receiving layer on at least one side of a substrate. The substrate may, for example, be synthetic paper, cellulose paper, cast coated paper, a film or a substrate having synthetic paper laminated on both sides of cellulose paper. The higher the adhesion with the ink layer, the more uniform the transfer of the dye at the time of recording. Accordingly, the surface of the substrate is preferably smooth, and it is preferred to employ a substrate having a Beck smoothness of at least 10,000 seconds. From this viewpoint, a substrate made of synthetic paper or a film is preferred.

The image-receiving layer is a layer composed mainly of a resin and serves to receive the dye to form an image. The resin is preferably a resin which is readily dyeable by the dye, and it may, for example, be a vinyl chloride or vinyl acetate resin, a polyester resin, an AS resin or a polyvinyl acetal resin. These resins may be used in combination. It is not advisable to use a resin having a glass transition temperature which is too low, since the image tends to bleed during the storage. As the image-receiving layer, an image-receiving layer having a glass transition temperature of at least 35° C., is preferred.

To the image-receiving layer, various additives may be added as the case requires in addition to the resin. Such additives include a curing agent such as an isocyanate for curing the resin, a release agent such as silicone to be added to prevent fusion with the ink layer at the time of the thermal transfer, an ultraviolet absorber to increase the light resistance, and an antioxidant to improve the weather resistance, but the additives are not limited to such specific examples.

Now, the present invention will be described in further detail with reference to Examples. However, it should be understood that the present invention is by no means restricted to such specific Examples.

EXAMPLE 1 a) Preparation of dye No. 1 as identified in Table 1

1.30 g (0.0061 mol) of 4-(4'-methoxyphenylazo)aniline was charged into an aqueous hydrochloric acid solution, and 0.44 g of sodium nitrite was added thereto, followed by stirring at a temperature of from 0 to 5° C. for two hours. The reaction solution was added to 0.66 g of o-cresol and an aqueous solution having sodium carbonate dissolved therein, followed by stirring at a temperature of from 0 to 5° C. for one hour and then by neutralization, whereupon precipitated crystals were collected by filtration, washed with water, suspended, again washed with methanol and dried to obtain 1.63 g of yellow crystals.

The mass spectrum of this product showed a parent ion peak of 346, which agreed to the molecular weight of the structural formula of No. 1. Further, the maximum absorption wavelength in acetone was 393.9 nm, and the melting point was 161° C.

a) Preparation of ink

| | |
|---|---|
| Dye No. 1 | 3 Parts by weight |
| Polyvinylbutyral resin (BX-1, manufactured by Sekisui Chemical Co., Ltd.) | 5 parts by weight |
| Toluene | 60 parts by weight |
| Tetrahydrofuran | 60 parts by weight |
| Total | 128 parts by weight |

A mixture having the above composition was treated for 30 minutes by a ultrasonic cleaning machine to prepare an ink.

c) Preparation of thermal transfer sheet

The above ink was coated on a polyethylene terephthalate film (6 μm thickness) by means of a wire bar and dried (the dried layer thickness: about 1 μm). Then, a liquid comprising 10 parts by weight of an acrylic resin (BR-80, tradename, manufactured by Mitsubishi Rayon Co., Ltd.), 1 part by weight of an amino-modified silicone oil (KF393, tradename, Shinetsu Chemical Co., Ltd.) and 89 parts by weight of toluene, was coated on the rear side of the polyethylene terephthalate film and dried (dried layer thickness: about 1 μm) to obtain a thermal transfer sheet.

d) Preparation of image-receiving sheet

A liquid comprising 70 parts by weight of a polyvinylphenyl acetal, 30 parts by weight of a vinyl chloride/vinyl acetate/vinyl alcohol copolymer resin (Esrec A, tradename, Sekisui Chemical Industry Co., Ltd.), 30 parts by weight of a silicone varnish (TSR-160, tradename, solid content concentration: 60%, manufactured by Toshiba Silicone Co., Ltd.), 15 parts by weight of hexamethylene diamine isocyanate compound (Mitech NY-710A, tradename, solid content concentration: 75%, manufactured by Mitsubishi Chemical Corporation), 2.5 parts by weight of an amino-modified silicone (KF-393, tradename, manufactured by Shinetsu Chemical Co., Ltd.), 600 parts by weight of methyl ethyl ketone and 600 parts by weight of toluene, was coated on synthetic paper (Yupo FPG150, tradename, manufactured by Oji Yuka K. K.) by a wire bar and dried (dried layer thickness: about 5 μm), further followed by treatment at 80° C. for 30 minutes in an oven to obtain an image-receiving sheet.

e) Transfer recording

The ink-coated side of the above thermal transfer sheet was put on the image-receiving sheet, and recording was carried out under the following conditions by means of a thermal head, to obtain a recorded product having properties as identified in Table 2.

| Recording conditions | |
|---|---|
| Main scanning and subscanning recording density: | 6 dots/mm |
| Recording electrical power: | 0.21 W/dot |
| Current conducted time: | 12 mmsec. |

The color density was measured by means of densitometer TR-927 Model, manufactured by MacBeth Company.

f) Light resistance test

The light resistance test of the obtained recorded product (recording density: about 1.0) was carried out (black panel temperature: 63±2° C.) by means of a xenon lamp fademeter (manufactured by Suga Shikenki K. K.), whereby the degree of color fading or change ($\Delta E$ ($L^*a^*b^*$)) of the recorded product after irradiation for 80 hours, is shown in Table 2 given hereinafter.

g) Measurement of color tone

The obtained recorded product (recording density: about 1.0) was measured by $\Sigma 80$ manufactured by Nippon Denshoku Kogyo K. K., and the results are shown in Table 2 given hereinafter.

EXAMPLE 2

Using dye No. 2 as identified in Table 1 instead of the dye employed in Example 1, preparation of an ink, preparation of a thermal transfer sheet, preparation of an image-receiving sheet, transfer recording, a light resistance test and measurement of a color tone, were carried out in the same manner as in Example 1, whereby the results as shown in Table 2 were obtained.

Comparative Example 1

Using the following dye (the dye disclosed in Example 2-2 in JP-A-60-180889 instead of the dye employed in Example 1, preparation of an ink, preparation of a transfer sheet, transfer recording, a light resistance test and measurement of a color tone, were carried out in the same manner as in Example 1, whereby the results as shown in Table 2 were obtained.

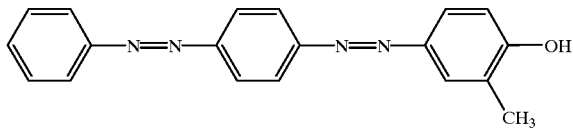

Comparative Example 2

Using the following dye (Example 2-4 in JP-A-60-108889) instead of the dye employed in Example 1, preparation of an ink, preparation of a thermal transfer sheet, transfer recording, a light resistance test and measurement of a color tone, were carried out in the same manner as in Example 1, whereby the results shown in Table 2, were obtained.

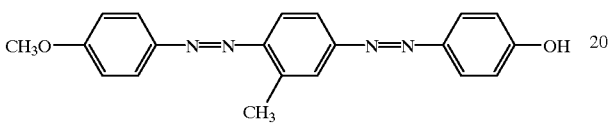

TABLE 2

|  | Color density | Light resistance | Color tone L* | a* | b* |
| --- | --- | --- | --- | --- | --- |
| Example 1 | 2.03 | 3.2 | 85.7 | 3.5 | 61.8 |
| Example 2 | 1.88 | 4.7 | 84.7 | 3.4 | 57.3 |
| Comparative Example 1 | 1.76 | 3.1 | 85.0 | 3.9 | 57.4 |
| Comparative Example 2 | 2.06 | 2.9 | 85.8 | 2.9 | 52.4 |

As is evident from Examples and Comparative Examples, the dye of Comparative Example 1 wherein ring A in the formula (I) has no $OR^1$ group, has a low color density, and the dye of Comparative Example 2 wherein the benzene ring connecting two azo groups has a substituent, has a low b* value which is an index of clearness of the color tone. Whereas, the dyes in Examples of the present invention exhibit good performance in the balance of all of the color density, light resistance and color tone.

EXAMPLE 3

Using an ink prepared by the following method instead of the ink employed in Example 1, preparation of a thermal transfer sheet, preparation of an image-receiving sheet, transfer recording, a light resistance test, a color migration test and a storage stability test of the thermal transfer sheet, were carried out in the same manner as in Example 1, whereby a record of a uniform color density was obtained. The obtained recorded product had good light resistance and little color migration, and the dark storage stability of the recorded product was excellent.

| Preparation of ink | |
| --- | --- |
| The same dye as in Example 1 (dye No. 1) | 6 g |
| AS resin (Denka AS-S, tradename, manufactured by Denki Kagaku Kogyo K.K.) | 10 g |
| Toluene | 70 g |

| -continued | |
| --- | --- |
| Preparation of ink | |
| Cyclohexanone | 10 g |
| Total | 96 g |

When a heat transfer sheet containing the dye of the present invention is employed, it is possible to obtain with a low energy a high density clear yellow-colored recorded product with excellent light resistance and little color migration. Further, this thermal transfer sheet and the obtained recorded product are hardly crystalizable and have excellent storage stability.

What is claimed is:

1. A thermal transfer sheet having an ink layer comprising a disazo dye of the formula (I) and a binder:

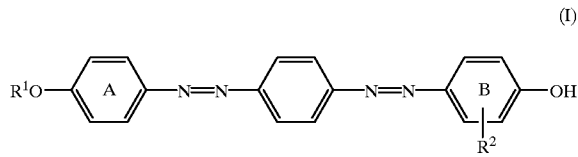

(I)

wherein each of rings A and B which are independent of each other, is a benzene ring which may have a substituent, $R^1$ is a $C_{1-4}$ substituted or unsubstituted alkyl group, and $R^2$ is a group selected from the group consisting of a hydrogen atom and a $C_{1-4}$ substituted or unsubstituted alkyl group.

2. A disazo dye of the formula (II):

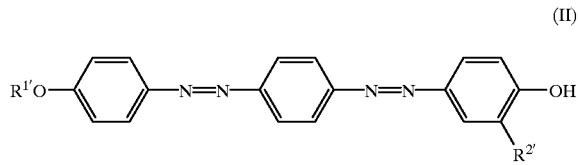

(II)

wherein each of $R^{1'}$ and $R^{2'}$ which are independent of each other, is a group selected from the group consisting of a methyl group and an ethyl group.

3. A thermal transfer sheet having an ink layer comprising a disazo dye of the formula (II) as defined in claim 2 and a binder.

4. An ink for thermal transfer recording, comprising a disazo dye of the formula (II) as defined in claim 2 and an organic solvent.

* * * * *